(12) United States Patent
Krill et al.

(10) Patent No.: US 8,829,417 B2
(45) Date of Patent: Sep. 9, 2014

(54) LIDAR SYSTEM AND METHOD FOR DETECTING AN OBJECT VIA AN OPTICAL PHASED ARRAY

(75) Inventors: Jerry A. Krill, Fulton, MD (US); Michael J. O'Driscoll, Stafford, VA (US); Michael C. Gross, Montgomery Village, MD (US); Stergios J. Papadakis, Ellicott City, MD (US); Gerald F. Ricciardi, Mount Airy, MD (US); Isaac N. Bankman, Clarksville, MD (US); Joseph S. Peri, Jessup, MD (US)

(73) Assignee: The Johns Hopkins University, Baltimore, MD (US)

( * ) Notice: Subject to any disclaimer, the term of this patent is extended or adjusted under 35 U.S.C. 154(b) by 416 days.

(21) Appl. No.: 13/291,668

(22) Filed: Nov. 8, 2011

(65) Prior Publication Data
US 2012/0286136 A1 Nov. 15, 2012

Related U.S. Application Data

(60) Provisional application No. 61/411,261, filed on Nov. 8, 2010.

(51) Int. Cl.
| G06M 7/00 | (2006.01) |
| G01S 17/66 | (2006.01) |
| G01S 17/02 | (2006.01) |
| G01S 17/42 | (2006.01) |
| G01S 17/87 | (2006.01) |
| G01S 7/481 | (2006.01) |

(52) U.S. Cl.
CPC ............... *G01S 17/026* (2013.01); *G01S 17/66* (2013.01); *G01S 17/42* (2013.01); *G01S 17/87* (2013.01); *G01S 7/4817* (2013.01)
USPC .......................................... 250/221; 250/206

(58) Field of Classification Search
CPC ..... G01S 7/4804; G01S 7/486; G01S 17/026; G01S 17/00; A61H 3/061; G09B 21/00; G07C 9/00; G07C 9/00111
USPC ........... 250/203.1, 203.2, 203.6, 206, 559.04, 250/559.11, 559.12, 559.13, 559.15, 221, 250/222.1; 340/555–557; 356/4.01; 359/1
See application file for complete search history.

(56) References Cited

U.S. PATENT DOCUMENTS

| 5,013,151 A | 5/1991 | Hughes |
| 5,529,138 A | 6/1996 | Shaw et al. |

(Continued)

OTHER PUBLICATIONS

Stergios J. Papadakis et al., A Flat Laser Array Aperture, Proc. of SPIE vol. 7666, 2010, 76661S-1 to S-10.

(Continued)

*Primary Examiner* — Francis M Legasse, Jr.
(74) *Attorney, Agent, or Firm* — Noah J. Hayward

(57) ABSTRACT

A device for detecting a presence of an object includes an optical phased array, a detector, a processing portion and an indicator. The optical phased array can transmit a first optical beam to a first location at a first time and can transmit a second optical beam to a second location at a second time. The detector can detect a first reflected beam based on the first optical beam and can detect a second reflected beam based on the second optical beam. The processing portion can determine the presence of the object based on the first reflected beam and the second reflected beam. The indicator can generate an indicator signal based on the presence of the object.

6 Claims, 9 Drawing Sheets

(56) References Cited

U.S. PATENT DOCUMENTS

| | | | |
|---|---|---|---|
| 6,882,409 B1* | 4/2005 | Evans et al. | 356/4.01 |
| 7,411,196 B2 | 8/2008 | Kalayeh | |
| 7,417,717 B2 | 8/2008 | Pack et al. | |
| 7,532,311 B2* | 5/2009 | Henderson et al. | 356/4.01 |
| 7,551,121 B1 | 6/2009 | O'Connell et al. | |
| 7,605,929 B2 | 10/2009 | Erfling et al. | |
| 7,715,887 B2 | 5/2010 | Cloutier et al. | |
| 7,899,616 B2 | 3/2011 | Breed | |
| 7,936,448 B2 | 5/2011 | Albuquerque et al. | |
| 2005/0285738 A1* | 12/2005 | Seas et al. | 340/557 |
| 2009/0079839 A1 | 3/2009 | Fischer et al. | |
| 2010/0053330 A1 | 3/2010 | Hellickson et al. | |
| 2010/0182587 A1* | 7/2010 | Fluckiger | 356/4.01 |
| 2010/0308429 A1 | 12/2010 | Ma et al. | |
| 2011/0043785 A1 | 2/2011 | Cates et al. | |

OTHER PUBLICATIONS

A. Vaduthalakuzhy et al., Implementation and Evaluation of a Swarming Sensor Network for Intrusion Detection, 2009 IEEE, ISSNIP 2009, pp. 225-230.

Konrad Wenzl et al., Multiple Hypothesis Tracking of Two Persons Using a Network of Lidar Sensors With Stationary and Directional Beams, Poc. of SPIE vol. 7710, 2010, 77100B-1 to B-10.

* cited by examiner

FIG. 6

| | | |
|---|---|---|
| 606 → | Detection range | 400 m at 10% reflectivity for human walker |
| 608 → | FSO communication range | 1 km |
| 610 → | Volume search coverage | 360° azimuth -0.1° to + 0.4° elevation |
| 612 → | Volume search coverage period | < 1 sec for 2% of volume, 30 sec all beam positions |
| 614 → | Transition to track | < 5 sec |
| 616 → | Track update rate | 1 Hz |

602

| | | |
|---|---|---|
| 618 → | Energy per pulse | 1.6 microjoule |
| 620 → | Pulse width | 4 nsec |
| 622 → | Pulse repetition interval | 25 µs |
| 624 → | Pulse integration | 4 pulses noncoherent |
| 626 → | Target dwell time | 100 µs |
| 628 → | Range resolution | 0.6 m |
| 630 → | Wavelength | 1550 nm |
| 632 → | F-number | 3 |
| 634 → | Beamwidth | 0.01° |
| 636 → | Pass band of elastic channel | 0.1 nm |
| 638 → | Quantum efficiency | 0.2 |
| 640 → | Receiver electronic bandwidth | 20 MHz |
| 642 → | Preamplifier current noise density | 2.12e-12 A Hz ½ |
| 644 → | Amplifier noise factor | 1 |
| 646 → | Non-multiplied dark current | 0.2e nA |
| 648 → | Multiplied dark current | 0.2e nA |
| 650 → | Detector noise factor | 20 |
| 652 → | Detector current gain | 100 |
| 654 → | Target area (person) | 11148 cm² (0.7×1.9 m) |
| 656 → | Target reflectance | 0.1 |
| 658 → | Array loss | 6 dB |

604

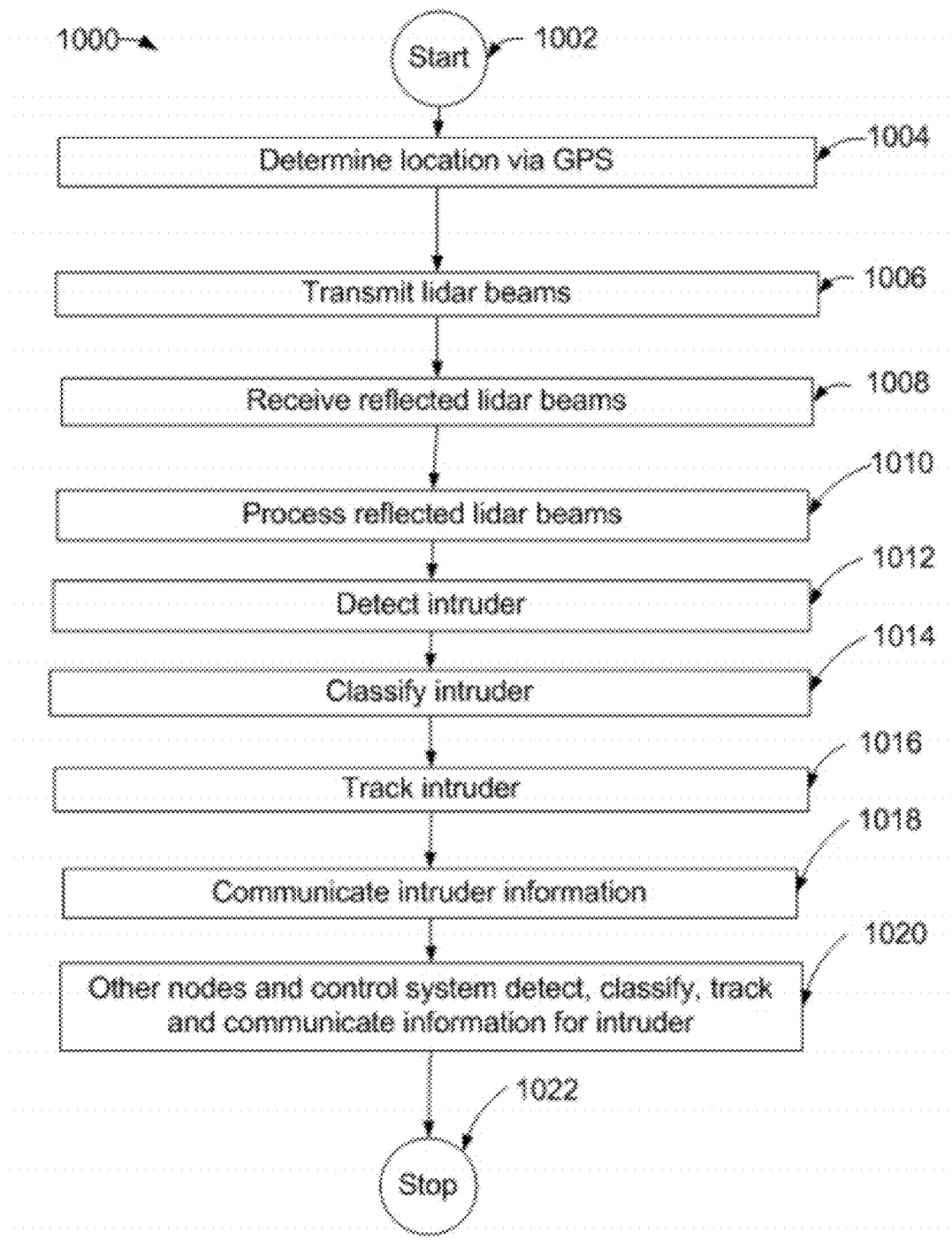

LIDAR SYSTEM AND METHOD FOR DETECTING AN OBJECT VIA AN OPTICAL PHASED ARRAY

CROSS-REFERENCE TO RELATED APPLICATION

This application claims priority to and the benefit of prior-filed, co-pending U.S. Provisional Application No. 61/411,261 filed Nov. 8, 2010, the entire content of which is incorporated herein by reference.

BACKGROUND OF THE INVENTION

1. Field of the Invention

The present invention relates to optical beam steering systems.

2. Description of the Related Art

Conventional methods for intruder detection include video monitoring, infrared detection and acoustic detection. These methods for intruder detection are human intensive for screening out false alarms.

What is needed is a system and method for detecting, classifying, tracking and communicating information for intruders which requires less human intervention for operation.

SUMMARY OF THE INVENTION

The present invention provides a system and method for an intruder network system for detecting, classifying, tracking and communicating information associated with an intruder.

In accordance with an aspect of the present invention, a device is provided for detecting a presence of an object. The device includes an optical phased array, a detector, a processing portion and an indicator. The optical phased array can transmit a first optical beam to a first location at a first time and can transmit a second optical beam to a second location at a second time. The detector can detect a first reflected beam based on the first optical beam and can detect a second reflected beam based on the second optical beam. The processing portion can determine the presence of the object based on the first reflected beam and the second reflected beam. The indicator can generate an indicator signal based on the presence of the object.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate at least one exemplary embodiment of the present invention and, taken together with the description, explain the principles of the invention. In the drawings:

FIG. 6 is an example illustration of a table for the characteristics and design parameter values for the system as described with reference to FIG. 1, in accordance with an aspect of the present invention;

FIG. 10 illustrates an example method for detecting, classifying, tracking and communicating information associated with an intruder, in accordance with an aspect of the present invention.

DETAILED DESCRIPTION

In accordance with aspects of the present invention, an intruder network system is presented for detecting, classifying and tracking an intruder via lidar.

Lidar is an optical remote sensing technology that can measure the distance to, or other properties of a target or an intruder by illuminating the target with light. Light is often generated using pulses from a laser. Lidar may use ultraviolet, visible or near infrared light in order to receive and process light reflected from surrounding objects and terrain. Light is typically reflected via backscattering. In an example embodiment, an optical phased array may include that which described in U.S. patent application Ser. No. 13/047,379, filed Mar. 14, 2011, titled "System and Method for Using Planar Device to Generate and Steer Light Beam," to Papadakis et al., the entire disclosure of which is incorporated by reference herein.

Furthermore, intruder network system communicates information associated with intruder to other nodes and a control system in order to perform further detection, classification, tracking and communication for the intruder by the other nodes and the control system.

Intruder network system provides a lidar sensor network using a flat, optical phase array laser aperture. The network of optical phase array lidars provides automatic collaborative detection, tracking, classifying and acquisition cueing. The network includes a plurality of nodes for performing lidar processing. As a non-limiting example, a node of the system is configured with four optical phased arrays, each with approximately 1 million radiating elements in a 1-cm$^2$ aperture enabling electronic beam steering. Furthermore, the four arrays are mounted on four sizes of a structural component associated with a node thereby providing a 360 degree field of view. A plurality of nodes provides detection, tracking, classifying and acquisition cueing over a large geographical area.

Intruder network system provides a three-dimensional position of objects using a single sensor device. Furthermore, processing by system does not require correlation or estimation algorithms.

A plurality of nodes enables collaboration between the node devices for conditions of obstacle blockages and countermeasures such as lidar blinding.

Intruder network system may operate in daylight or nighttime conditions, as compared to some conventional systems which only operate in nighttime conditions (e.g. passive infrared).

Aspects of the present invention will now be described in detail with reference to FIGS. 1-10.

Figure 1:
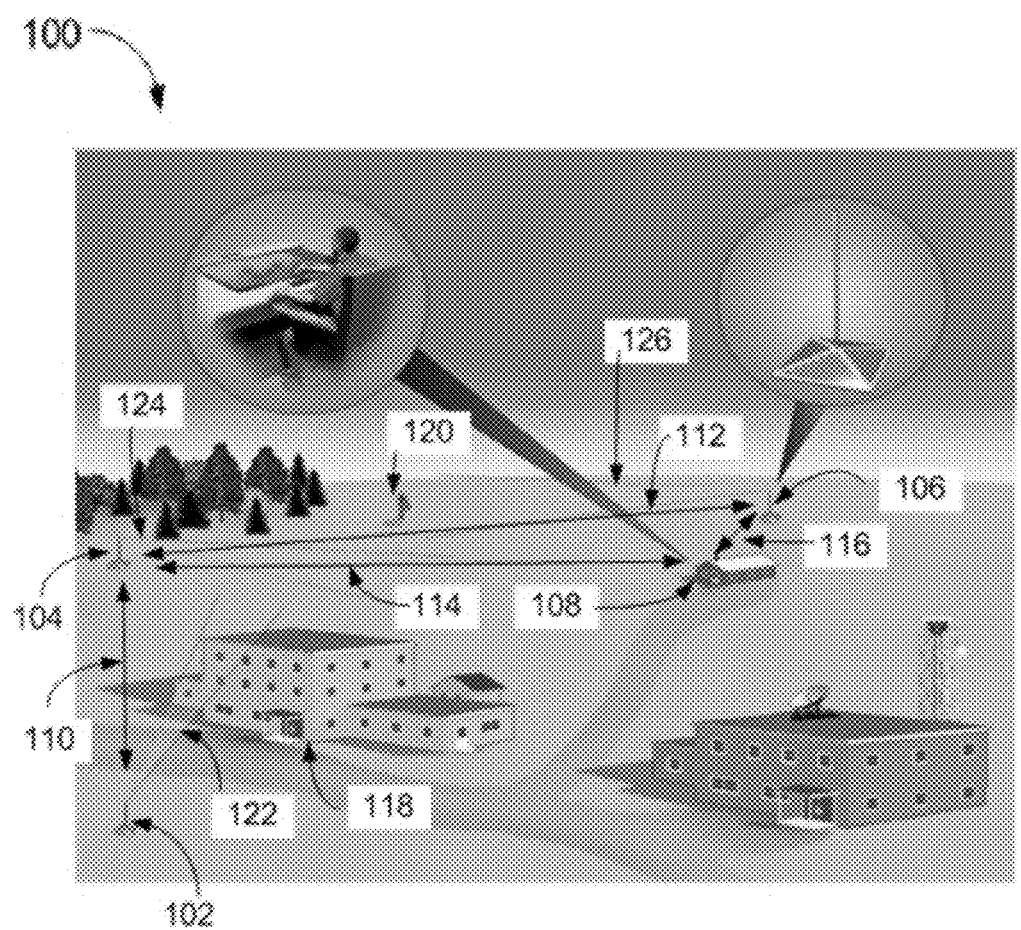
FIG. 1 is an illustration for an example intruder network system, in accordance with an aspect of the present invention.

FIG. 1 is an illustration for an example intruder network system 100, in accordance with an aspect of the present invention.

Intruder network system 100 includes a node 102, a node 104 and a node 106 and a control station 108.

Intruder network system 100 performs operations associated with intruder search, detection, classification, tracking and communicating. As a non-limiting example, intruder network system 100 may be used for detecting, classifying and tracking a person trespassing on an entities property and for communicating information associated with a trespassing person.

Nodes 102, 104 and 106 search for, detect, classify and track intruders and communicate information associated with intruders. Furthermore, nodes 102, 104 and 106 search for, detect, classify and track intruders and communicate information optically.

Control station 108 communications information bi-directionally with the nodes and presents information received and processed from nodes.

Node 102 communicates bi-directionally with node 104 via an optical communication channel 110. Node 104 communicates bi-directionally with node 106 via an optical communication channel 112. Node 104 communicates bi-directionally with control station 108 via an optical communication channel 114. Node 106 communicates bi-directionally with control station 108 via an optical communication channel 116.

In this example, node 102 is not able to communicate directly with node 106 or control station 108 due to an obstruction 118 blocking the line-of-sight between node 106 and control station 108. Node 102 may communicate with node 106 and/or control station 108 indirectly via communication with node 104. Nodes 102, 104, 106 and/or control station 108 may communicate bi-directionally with one another directly and/or indirectly.

Intruder network system 100 performs searches for, detects, classifies, tracks and communicates information associated with an intruder 120.

Node 102 transmits a lidar beam 122. Furthermore, node 102 receives and processes reflections of lidar beam 122. Node 104 transmits a lidar beam 124. Furthermore, node 104 receives and processes reflections of lidar beam 124. Node 106 transmits a lidar beam 126. Furthermore, node 106 receives and processes reflections of lidar beam 126.

Nodes 102, 104 and 106 perform operations associated with intruders by transmitting a plurality of optical beams and receiving and processing reflections of the transmitted optical beams. Furthermore, nodes 102, 104 and 106 transmit, receive and process information from the other nodes and control station 108 associated with intruders.

As an example of typical operation, node 102 transmits lidar beam 122, node 104 transmits lidar beam 124 and node 106 transmits lidar beam 126. Node 102 receives and processes reflections of lidar beam 122. Node 104 receives and processes reflections of lidar beam 124. Node 106 receives and processes reflections of lidar beam 126. Node 106 detects intruder 120. Node 106 classifies intruder 120. Node 106 tracks intruder 120. Node 106 communicates information associated with intruder 120 to node 102, 104 and control station 108. If possible, node 102 searches for, classifies, tracks and communicates information for intruder 120. If possible, node 104 searches for, classifies, tracks and communicates information for intruder 120. Node 102 and node 104 communicate information associated with intruder 120 to node 106 and control station 108. Control station 108 receives and processes information associated with intruder 120 and presents received and processed information for viewing. Furthermore, control station 108 may communicate an alarm or an alert associated with received and processed information associated with intruder 120.

FIG. 1 is an illustration for an example intruder network system where nodes transmit optical beams, receive and process reflected beams, search for, detect, classify, track and communicate information associated with an intruder or intruders.

In an example embodiment, node 102 receives and converts light energy to electrical energy for storage, provides electrical power via stored electrical energy, determines location information and time information via a GPS receiver, transmits a shaped beam, receives a reflected beam, processes reflected beam, communicates processed information to external nodes, receives information from external nodes and processes information received from external nodes. This will be described in greater detail with reference to FIG. 2.

Figure 2:
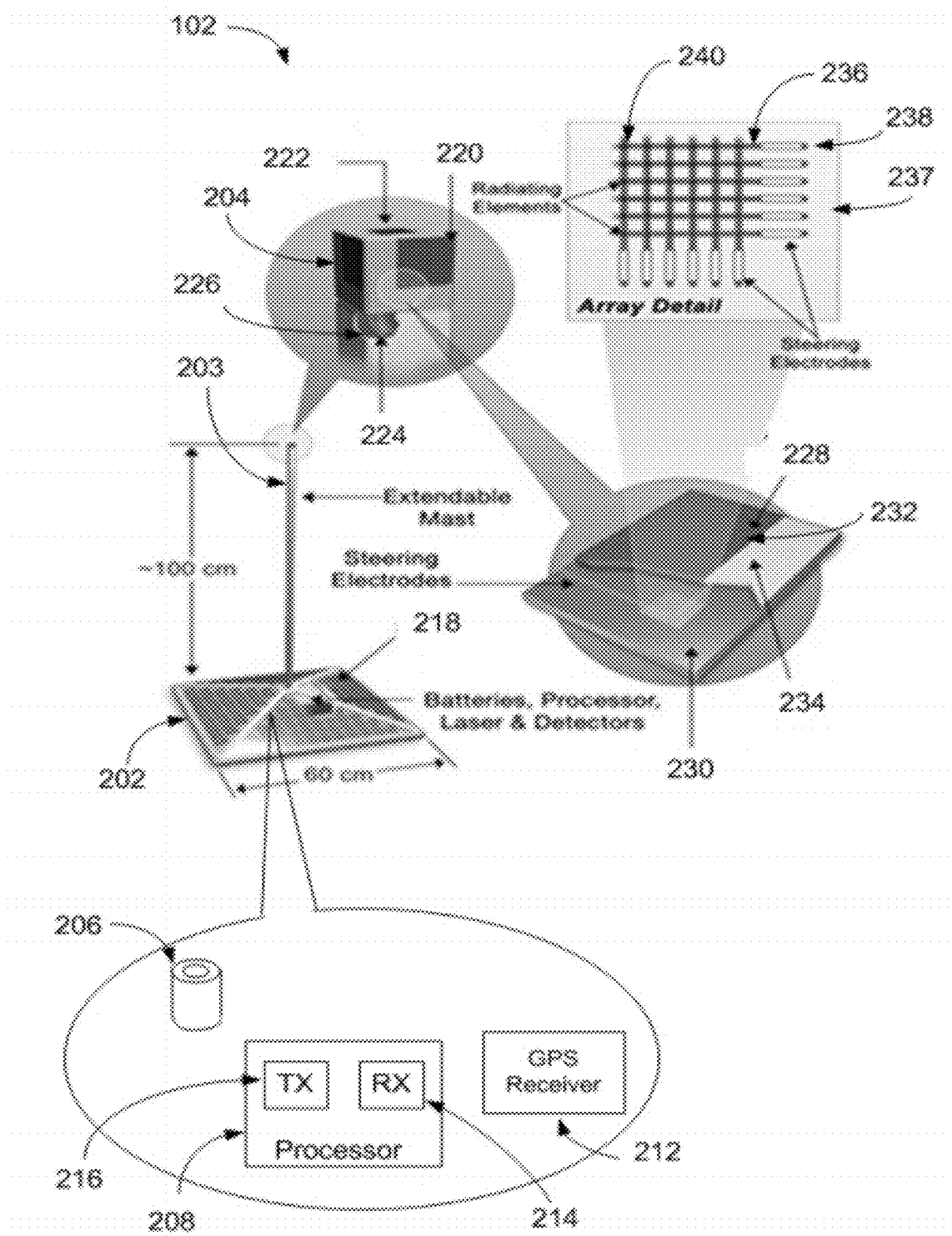
FIG. 2 illustrates an example node as described with reference to FIG. 1, in accordance with an aspect of the present invention.

FIG. 2 illustrates an example of node 102 as described with reference to FIG. 1, in accordance with an aspect of the present invention.

Node 102 includes an enclosure 202, an extendable mast 203 and an optical array cube 204.

Enclosure 202 provides support for and containment of electronic devices. As a non-limiting example, enclosure 202 may be configured in a square shape with a side dimension of approximately 60 centimeters.

Extendable mast 203 provides height for electronic devices and as a conduit for communication cables between electronic equipment located in the top of extendable mast 203 and electronic equipment located within enclosure 202. Extendable mast 203 may be configured for a variety of heights. As a non-limiting example, extendable mast 203 may be configured for approximately 100 centimeters.

Enclosure 202 includes a battery portion 206, a processor portion 208, a GPS receiver 212, a receiver portion 214, a transmitter portion 216 and a solar panel portion 218. In this example embodiment, receiver portion 214 and transmitter portion 216 are distinct elements. In other embodiments, receiver portion 214 and transmitter portion 216 may be combined as a unitary device. Further, in this example embodiment, GPS receiver 212 and processor portion 208 are distinct elements. However, in other embodiments, GPS receiver 212 and processor portion 208 may be combined as a unitary device. Battery portion 206 receives, stores and provides electrical power. Processor portion 208 provides execution of operational codes and storage/retrieval of information for controlling the operation of node 102. GPS receiver 212 receives and processes information received via radio waves for determining geographic location with respect to the Earth. Furthermore, GPS receiver 212 provides location and time information for synchronization nodes. Receiver portion 214 may be a dual lidar/communication element, wherein it is operable to receive information optically and by RF. Receiver portion 214 may include a plurality of receiver elements, the combination of which provides a combined ability to communicate with other nodes and to receive optical information from a lidar sweep, as will be described in greater detail later.

In an example embodiment, receiver portion 214 receives information optically associated with intruder detection, classification and tracking and receives information from external entities. Transmitter portion 216 may be a dual lidar/communication element, wherein it is operable to transmit information optically and by RF. Transmitter portion 216 may include a plurality of transmitter elements, the combination of which provides a combined ability to communicate with other nodes and to transmit optical information from to create a lidar sweep, as will be described in greater detail later. In an example embodiment, transmitter portion 216 transmits information optically for performing intruder detection, classification and tracking and for communicating with external entities. Solar panel portion 218 receives light energy and converts the light energy to electrical energy.

Extendable mast 203 includes an optical fiber portion 224 and an electrical cable portion 226. Optical fiber portion 224 includes a plurality of optical fibers for bi-directional optical communication. Electrical cable portion 226 includes a plurality of electrical cables for bi-directional communication and for providing electrical power. Optical array cube 204 includes a plurality of optical phased arrays with a sampling noted as an optical phased array 220 and a GPS antenna 222.

Optical phased array 220 performs beam shaping for a lidar beam. GPS antenna 222 receives radio waves from external entities. A non-limiting example of an external entity is a GPS satellite. Optical fiber portion 224 provides a conduit for transmitting and receiving optical beams. Electrical cable portion 226 provides a conduit for transmitting and receiving electrical signals and provides a conduit for transmission of electrical power.

Optical phased array 220 includes an optical layer portion 228 and an integrated circuit layer portion 230. Optical layer portion 228 provides transmission, distribution and shaping for an optical beam. Integrated circuit layer portion 230 provides control and configuration of optical layer portion 228. Optical layer portion 228 includes an array aperture 232 and an optical feed 234. Array aperture 232 provides steering for an optical beam. Optical feed 234 provides a conduit for an optical beam.

Array aperture 232 includes an array of crossed optical waveguides with a sampling noted as an optical waveguide 236. An optical waveguide is a physical structure for guiding electromagnetic waves in the optical spectrum. The rows and columns associated with the array of crossed optical waveguides are spaced pseudo-randomly in order to minimize cross-coupling while providing adequate array element density and side-lobe control. Optical waveguides are fabricated in an electro-optic (EO) material. As a non-limiting example, the EO material may be polymethyl mathacrylate.

Optical waveguides are controlled via a steering electrodes portion 237 with a sampling noted as a steering electrode 238.

Steering electrodes control the phase of the light at the associated intersections and as a result perform optical beam steering. For an N×N array of optical waveguides, an associated 2N steering electrodes are provided. The steering electrodes are located on the back side of optical layer portion 228 enabling control by integrated circuit layer portion 230.

Integrated circuit layer portion 230 receives and translates beam steering directions received from processor portion 208 into information for controlling the steering electrodes. As a non-limiting example, information may be conveyed from integrated circuit layer portion 230 to steering electrodes via a voltage.

A ground plane (not shown) is configured by placing of an L-shaped electrode on top of optical layer portion 228 and over the steering electrodes. A plurality of intersections is formed at the location where the optical waveguides cross with a sampling noted as an intersection 240.

Optical feed 234 includes a cascade of multimode-interface (MMI) splitters providing distribution of an optical beam. Optical waveguides are fed along their lower edge by edge-coupled optical fibers traversing extendable mast 203 and terminating in enclosure 202. Optical fibers carry optical power from transmitter portion 216 and to receiver portion 214.

As a non-limiting example, polymethyl mathacrylate yields an average waveguide period of 9 μm. Furthermore, as a non-limiting example, for N=1000, the 9 μm spacing yields a total array size of 9×9 mm. Furthermore, as a non-limiting example, the steering electrodes and MMI splitters occupy approximately 5 mm of length for optical layer portion 228 resulting in an area size for array aperture 232 of approximately 15×15 mm.

The extendibility of extendable mast 203 enables obstacle clearance and sufficient range to the optical horizon.

In operation, solar panel portion 218 receives light energy (e.g. Sun) and converts the light energy to electrical energy. The generated electrical energy is transferred to and stored by battery portion 206. Battery portion 206 provides electrical power to electrical and electronic devices associated with node 102. GPS receiver 212 receives and processes positioning and time information by way of GPS satellites, GPS antenna 222 and electrical cable portion 226.

A laser portion 210 provides an optical light beam to optical phased array 220 via laser portion 210 and optical fiber portion 224. Processor portion 208 determines and communicates beam steering information to optical phased array 220 via electrical cable portion 226. Integrated circuit layer portion 230 receives and processes steering information and communicates configuration information to steering electrodes portion 237. Steering electrodes configure beam shape for transmitted beam.

Transmitted beam traverses external to node 102, impinges on external objects and is reflected back to node 102. Reflected beam is received by optical phased array 220 and communicated to receiver portion 214 via optical fiber portion 224. Receiver portion 214 communicates received information to processor portion 208. Processor portion 208 receives and processes information for determining information associated with external objects. Processor portion 208 communicates processed information associated with external objects to external nodes via transmitter portion 216, optical fiber portion 224 and optical phased array 220.

External nodes receive and process information. External nodes communicate processed information to processor portion 208 by way of optical phased array 220, optical fiber portion 224 and receiver portion 214. Processor portion 208 receives and processes information from external nodes.

Figure 3:
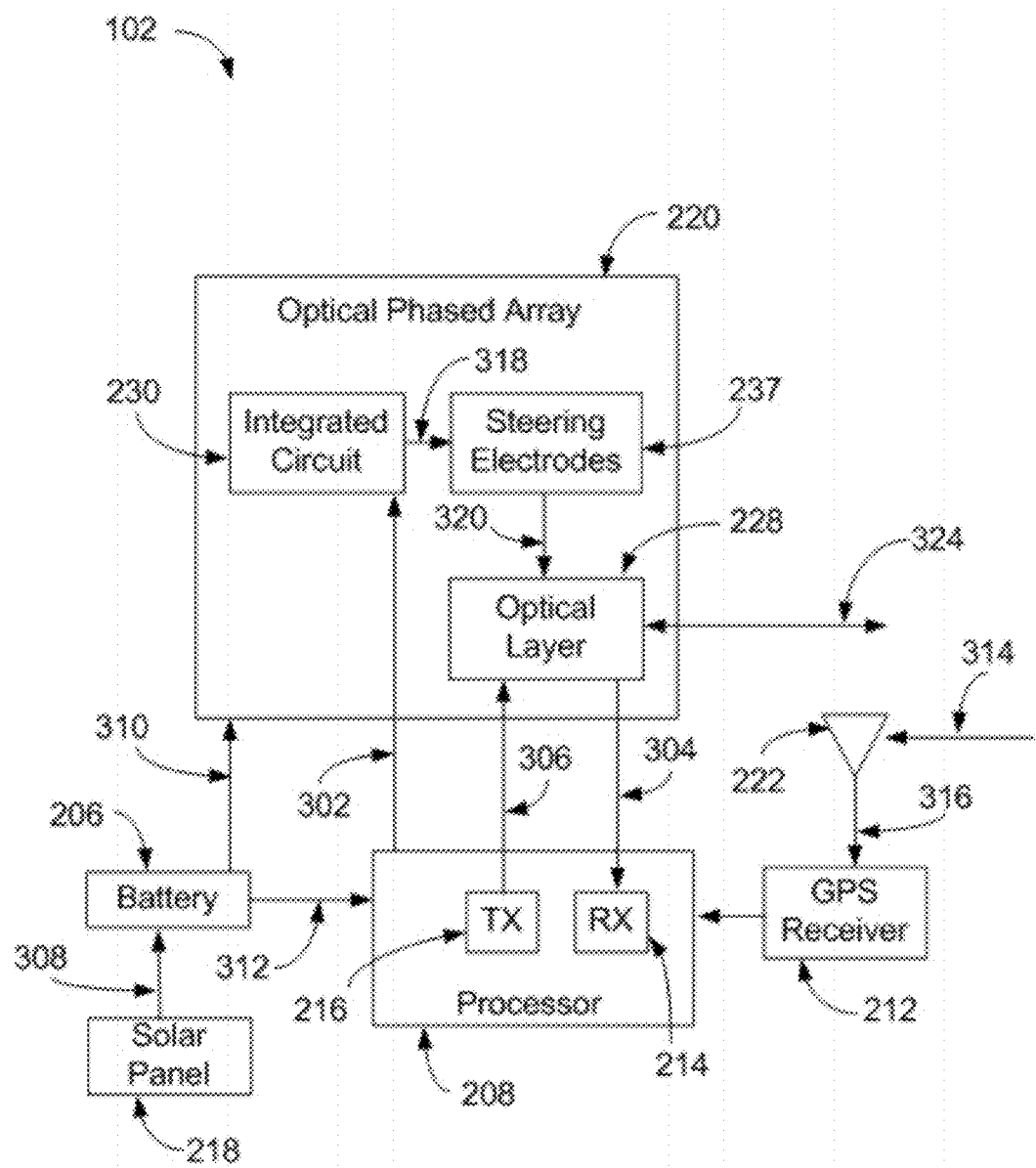
FIG. 3 is a block diagram for example node as described with reference to FIG. 1, in accordance with an aspect of the present invention.

FIG. 3 is a more detailed block diagram for node 102 as described with reference to FIG. 1, in accordance with an aspect of the present invention.

Integrated circuit layer portion 230 receives information from processor portion 208 via a communication channel 302. Receiver portion 214 receives information from optical layer portion 228 via an optical communication channel 304. Optical layer portion 228 receives information from transmitter portion 216 via an optical communication channel 306. Battery portion 206 receives electrical power from solar panel portion 218 via a power conduit 308. Optical phased array 220 receives electrical power from battery portion 206 via an electrical power conduit 310. Processor portion 208 receives electrical power from battery portion 206 via an electrical power conduit 312. GPS antenna 222 receives information from external entities via a communication channel 314. GPS receiver 212 receives information from GPS antenna 222 via a communication channel 316. Steering electrodes portion 237 receives information from integrated circuit layer portion 230 via a communication channel 318. Optical layer portion 228 receives information from steering electrodes portion 237 via a communication channel 320. Optical layer portion 228 communicates bi-directionally with external entities and performs detection, classification and tracking via an optical communication channel 324.

Further, in some embodiments at least one of processor portion 208, GPS receiver 212, receiver portion 214, transmitter portion 216, optical phased array 220, optical layer portion 228, integrated circuit layer portion 230 and steering electrodes portion 237 may be implemented as a computer having stored therein tangible computer-readable media for carrying or having computer-executable instructions or data structures stored thereon. Such tangible computer-readable media can be any available media that can be accessed by a general purpose or special purpose computer. Non-limiting examples of tangible computer-readable media include physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a tangible computer-readable medium. Combinations of the above should also be included within the scope of tangible computer-readable media.

In operation, solar panel portion 218 receives light energy (e.g. Sun) and converts the light energy to electrical energy. The generated electrical energy is transferred to and stored by battery portion 206 via electrical power conduit 308. Battery portion 206 provides electrical power to electrical and electronic devices associated with node 102 including processor portion 208 via electrical power conduit 312 and optical phased array 220 via electrical power conduit 310.

GPS receiver 212 receives and processes positioning and time information by way of GPS satellites (not shown), communication channel 316, GPS antenna 222 and communication channel 314. Transmitter portion 216 provides an optical light beam to optical layer portion 228 via optical communication channel 306. Processor portion 208 determines and communicates beam steering information to integrated circuit layer portion 230 via communication channel 302. Integrated circuit layer portion 230 receives and processes steering information and communicates configuration information to steering electrodes portion 237.

Steering electrodes configure beam shape for transmitted beam. Transmitted beam traverses external to node 102 via optical communication channel 324, impinges on external objects and is reflected back to node 102. Reflected beam is received by optical layer portion 228 and is communicated to receiver portion 214 via optical communication channel 304. Processor portion 208 receives reflected beam information via receiver portion 214. Processor portion 208 processes received information for determining information associated with external objects. Processor portion 208 communicates processed information associated with external objects to external nodes via transmitter portion 216, optical communication channel 306 and optical layer portion 228.

External nodes receive and process information. External nodes communicate processed information to processor portion 208 by way of optical layer portion 228, optical communication channel 304 and receiver portion 214. Processor portion 208 receives and processes information from external nodes.

Figure 4:
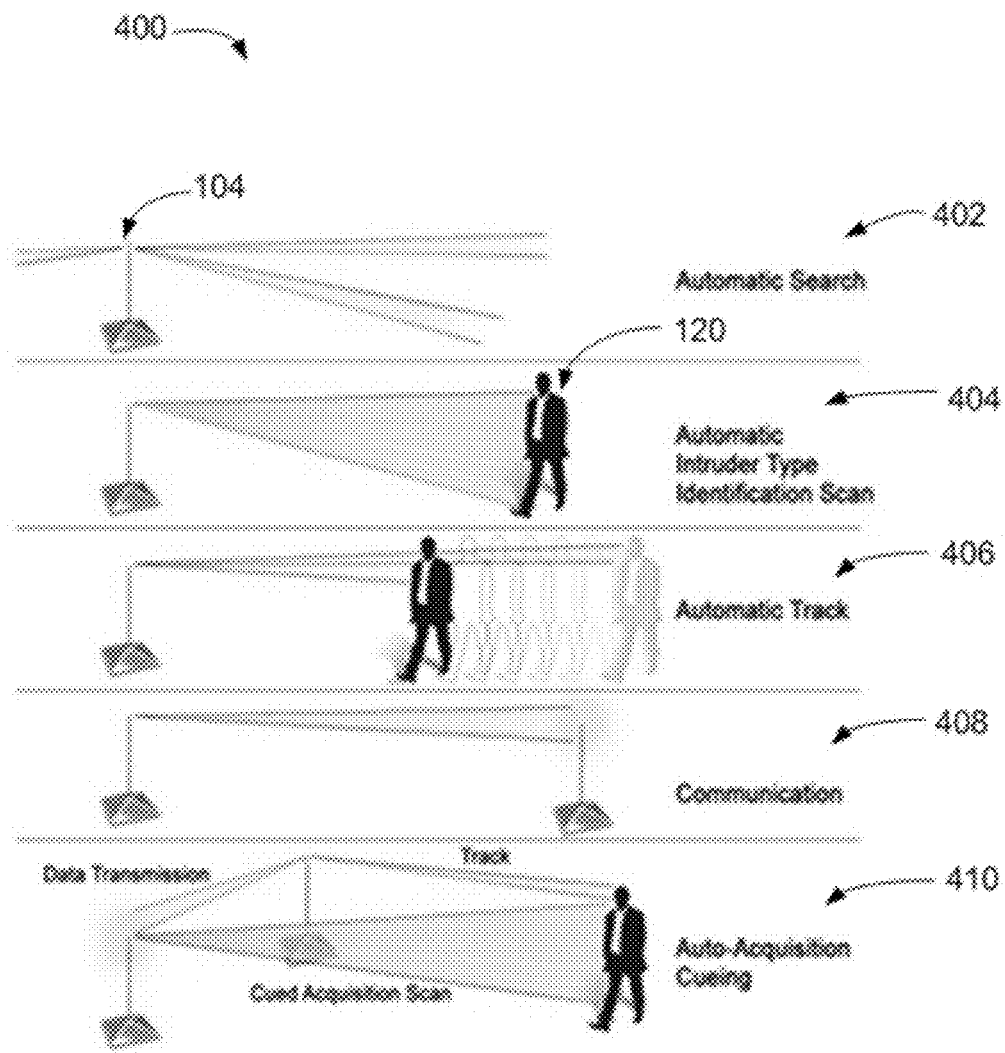
FIG. 4 is an example illustration for the operational modes for the intruder network system as described with reference to FIG. 1, in accordance with an aspect of the present invention.

FIG. 4 is an example illustration for the operational modes 400 for intruder network system 100 as described with reference to FIG. 1, in accordance with an aspect of the present invention.

Operational modes 400 include a search mode 402, a classification mode 404, a tracking mode 406, a communication mode 408 and a third-party acquisition mode 410.

Intruder network system 100 executes a plurality of modes for operation including searching, classifying, tracing, communicating and third-party acquiring.

For search mode 402, a node (e.g. node 102, 104 and/or 106 as described with reference to FIG. 1) transmits lidar beams and receives reflected lidar beams in order to detect the presence of a potential intruder.

In search mode 402, lidar beams are swept through the monitoring area in a pseudorandom pattern. The lidar beams are configured in a pseudorandom pattern in order to aid in defeating potential countermeasures. The transmitted lidar beams are reflected by external elements and received by the node. As an example, the node compares previous received reflected lidar beams with recently received lidar beams in order to determine movement associated with an external element (e.g. person, intruder, vehicle, etc.). As a further example, a pattern of reflected lidar beams received similar to previous lidar beams would indicate the absence of a potential intruder and a pattern of reflected lidar beams received dissimilar to previous lidar beams may indicate the presence of a potential intruder.

For classification mode 404, a node, following detection of a potential intruder, performs classification of the potential intruder. In the classification mode 404, intruder network system 100 transmits lidar beams with a fine pattern in order to get a high resolution representation of an intruder. The signature of the received intruder is then compared to a database of stored signatures in order to find a match for the intruder. For example, the intruder may be classified as an animal, human or vehicle.

In classification mode 404, the node compares the signature of the received reflected lidar beam with signatures of known intruder elements (e.g. person, truck, dog, cat, etc.) for determining a match. Node may use any known method for processing signatures for determining a match. Furthermore, the node may process the shape and/or size of the potential intruder to determine interest in further processing for the potential intruder.

For tracking mode 406, a node, following classification of a potential intruder, tracks the movement of the potential intruder. Based upon previous movements of the potential intruder estimates are generated for future movements of the potential intruder and processed for accuracy following movement of the potential intruder.

In tracking mode 406, the node estimates future movements of the potential intruder based upon previous movements of the potential intruder. Furthermore, actual movements are compared to actual movements for determining accuracy of estimates. Estimates of future movements are refined based upon comparisons of actual versus estimated movements.

For communication mode 408, a node, following completion for estimating future movements of potential intruder, communicates information associated with the potential intruder to other nodes and the control station.

In communication mode 408, non-limiting examples of information communicated to other nodes include velocity vector, acceleration, location, size, shape and estimated future velocity vector, acceleration and location.

For third-party acquisition mode 410, a node, following receipt of information associated with a potential intruder, processes the received information in order to detect, classify and track the potential intruder.

In third-party acquisition mode 410, a node receiving information from another node processes information to determine a configuration for detecting, classifying and tracking a potential intruder. Furthermore, node uses processed information for performing search mode 402, classification mode 404, tracking mode 406 and communication mode 408.

A plurality of nodes aids in compensating for blockages associated with terrain or for mitigating potential countermeasures. As an example, a potential intruder may successfully blind a node, but other non-blinded nodes may track the potential intruder.

A node may transmit lidar beams and receive reflected lidar beams for detecting, classifying and tracking a potential intruder. The node may additionally transmit lidar beams and receive reflected lidar beams for communicating information associated with potential intruder to other nodes and to the control station with control station communication information associated with potential intruder to other nodes. Further, other nodes may transmit lidar beams and receive reflected beams for detecting, classifying and tracking a potential intruder. Still further, other nodes may transmit lidar beams and receive reflected lidar beams for communicating information associated with intruder to other nodes and to the control station. This will be described in greater detail with additional reference to FIG. 5.

Figure 5:
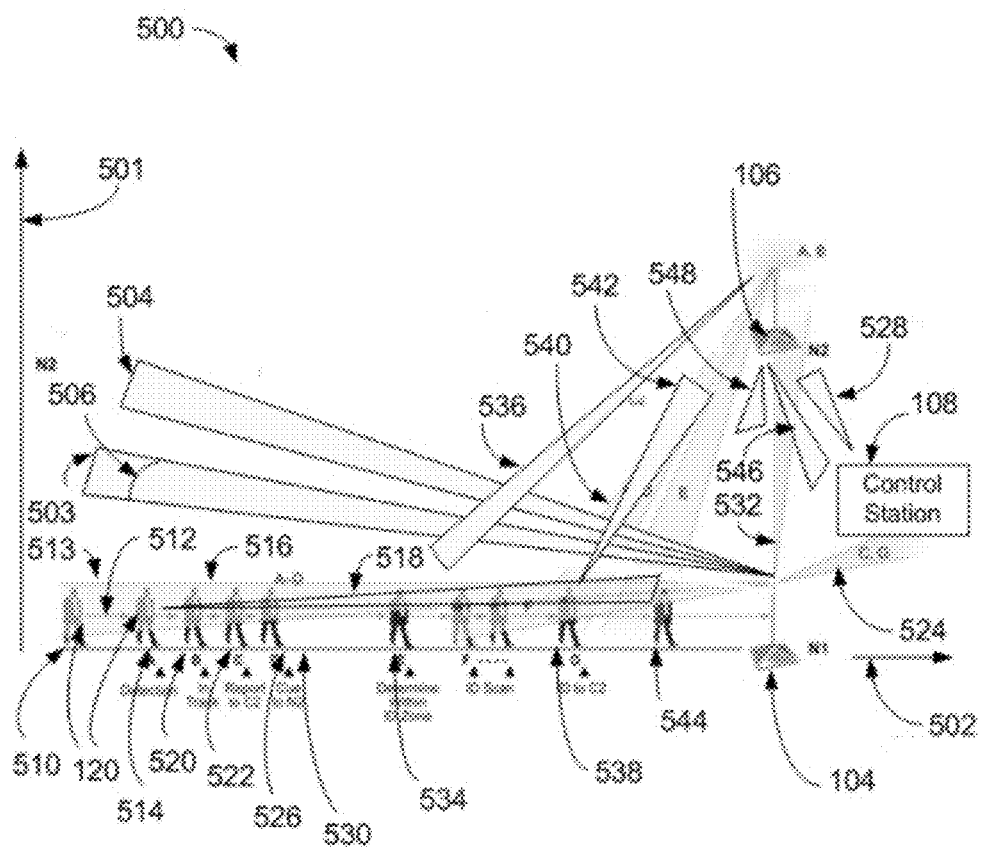
FIG. 5 is an example illustration of a graph for the operation of nodes as described with reference to FIG. 1, in accordance with an aspect of the present invention.

FIG. 5 is an example illustration of a graph 500 for the operation of nodes as described with reference to FIG. 1, in accordance with an aspect of the present invention.

Graph 500 includes a y-axis 501 with units of meters and an x-axis 502 with units of meters.

Node 104 (and node 106) transmits a plurality of lidar beams with a sampling noted as a lidar beam 503 and a lidar beam 504. The beams may be transmitted in any predetermined pattern. In some examples, the lidar beams are transmitted in a pseudo-random pattern. The beam width of lidar beam 503 is noted as a beam width 506. As a non-limiting example, beam width 506 is 0.01°.

Intruder 120 with a location noted as geographic location 510 and with direction of movement noted as a velocity vector 512 is not detected at a location noted as geographic location 510, as the distance between intruder 120 and node 104 is too large a distance for detection.

At a location for intruder 120 noted as a geographic location 514, node 104 transmits a plurality of lidar beams with a sampling noted as a lidar beam 513. Furthermore, transmitted lidar beams may be reflected by objects. Furthermore, a lidar beam 516 is reflected version of lidar beam 513 and noted as a reflected lidar beam 518. As a non-limiting example, geographic location 514 for detecting intruder 120 may be realized nominally at 0.4 kilometers in an unobstructed view.

Node 104 receives reflected lidar beam 518 and other associated reflected lidar beams, processes reflected beams and detects movement associated with intruder 120.

As a result of detecting intruder 120, node 104 transmits a contiguous pattern of lidar beams in the direction of intruder 120. Node 104 receives reflections from continuous pattern of lidar beams transmitted in direction of intruder 120 and performs a classification of intruder 120. As a non-limiting example, node 104 may classify intruder 120 as human, dog, cat, horse and automobile.

At a location for intruder 120 noted as a geographic location 520, node 104 tracks the location and movement of intruder 120 by estimating future information for intruder 120 followed by comparing estimated information with actually received information.

At a location for intruder 120 noted as a geographic location 522, node 104 communicates to information associated with intruder 120 to control station 108 via a lidar beam 524. Communication may be transmitted by node 104 and received by control station 108 during a periodic communication timeslot. Non-limiting examples of information communicated include node identification, node location, intruder coordinates and track state vector for correlation with the returns associated with other nodes.

At a location for intruder 120 noted as a geographic location 526, control station 108 communicates information associated with intruder 120 to node 106 via a lidar beam 528.

At a location for intruder 120 noted as a geographic location 530, node 106 receives information associated with intruder 120 from node 104 via a lidar beam 532.

Node 104 continues to periodically communicate updated information associated with intruder 120 to control station 108 and node 106. Control station 108 continues to periodically communicate update information associated with intruder 120 to node 106.

Node 106 monitors received information associated with intruder 120 and when intruder 120 is located at a geographic location 534 such that node 106 determines intruder 120 is within sufficient range for detection, node 106 transmits a lidar beam 536.

Node 106 continues attempts track intruder 120 until node 106 successfully detects intruder 120 or until node 106 experiences a timeout condition and ceases detection efforts for intruder 120. The timeout condition may be set at a predetermined time. As a non-limiting example, the timeout value for node 106 ceasing to attempt to detect intruder 120 is 10 minutes.

At a location for intruder 120 noted as a geographic location 538, node 106 transmits a lidar beam 540 that is reflected by intruder 120 as noted by a reflected lidar beam 542. Node 106 is able to detect, classify and track intruder 120 as a result of receiving reflected lidar beam 542 and successive reflected lidar beams.

At a location for intruder 120 noted as a geographic location 544, node 106 communicates information associated with intruder 120 to control station 108 via a lidar beam 546 and to node 104 via a lidar beam 548.

In an example embodiment a system in accordance with aspects of the present invention may perform intruder detection, classification and tracking during 0.9 of a second and perform communication activities during the remaining 0.1 of a second. The characteristics and design parameter values for such an example system will now be further described with reference to FIG. 6.

FIG. 6 is an example illustration of a table 600 for the characteristics and design parameter values for the system as described with reference to FIG. 1, in accordance with an aspect of the present invention.

Table 600 includes a characteristics table portion 602 and a design parameter table portion 604.

Characteristics table portion 602 provides operational information associated with the system as described with reference to FIG. 1. Design parameter table portion 604 provides design parameter values associated with the design and fabrication of the system as described with respect to FIG. 1.

A row 606 notes a detection range of 400 meters with a 10% reflexivity for a human moving about the pace of a walk. A value for 10% reflexivity represents the target impinged by a lidar beam reflecting 10% of the received lidar beam. A row 608 notes a Free Space Optical (FSO) range of 1 kilometer. A value of 1 kilometer indicates the operational range of the system enclosed in a vacuum. A row 610 notes volume search coverage of 360 degrees with an azimuth of 0.1° to +0.4° in elevation. System may search in 360 degrees and with an azimuth of −0.1° to +0.4° in elevation. A row 612 notes volume search coverage period as less than 1 second for 2% of volume and fifty seconds for the plurality of beam positions. System may search 2% of the search volume in less than 1 second and may search in the aggregate of beam positions in 50 seconds or less. A row 614 notes a transition to track of less than five seconds. System is able to track a potential intruder in less than 5 seconds from first detection of potential intruder. A row 616 notes a track update rate of 1 Hz. System may update tracking information with other nodes and control system at a rate of 1 Hz.

A row 618 notes an energy per pulse of 1.6 micro Joule. The amount of energy transmitted in a pulse may be configured for 1.6 micro Joule. A row 620 notes a pulse width of four nanoseconds. The pulse width of a transmitted beam may be configured for four nanoseconds. A row 622 notes a pulse repetition interval of 25 microseconds. System may transmit pulses at a rate of once every 25 microseconds. A row 624 notes a pulse integration of 4 non-coherent pulses. A row 626 notes a target dwell time of 100 microseconds. A row 628 notes a range resolution of 0.6 meters. A row 630 notes a wavelength of 1550 nanometers. System may transmit and receive lidar beams with a wavelength of 1550 nanometers. A row 632 notes a F-number of 3. The F-number of for an optical lens represents the ratio of the focal length to the diameter of its clear aperture. A row 634 notes a beam width of 0.01°. System may transmit a beam with an angular width of 0.01°. A row 636 notes a pass band of elastic channel of 0.1 nanometer. A row 638 notes a quantum efficiency of 0.2. Quantum efficiency represents the percentage of photons received by a photo-reactive surface producing an electron-hole pair. A row 640 notes a receiver electronic bandwidth of twenty MHz. Electronics associated with system for transmitting/receiving an optical signal may have a bandwidth of twenty MHz. A row 642 notes a pre-amplifier current noise density of 2.12e-12 $(A/HZ)^{1/2}$. A row 644 notes an amplifier noise factor of 1. Amplifier noise factor represents the amount of excess noise added to a signal by an amplifier. A row 646 notes a non-multiplied dark current of 0.2e nA. A row 648 notes a multiplied dark current of 0.2e nA. A row 650 notes a detector noise factor of twenty. Detector noise factor represents the amount of excess noise added to a signal by a detector. A row 652 notes a detector current gain of 100. The ratio of the input signal to the output signal may be configured as 100. A row 654 notes a target area associated with a person as 11148 $cm^2$ (0.7×1.9 m). A row 656 notes a target reflectance of 0.1. Target reflectance indicates the amount of a beam is reflected and in this case indicates 10% of a beam received by a target is reflected. A row 658 notes an array loss of 6 dB.

At the powers and pulse widths as noted in design parameter table portion 604, care needs to be taken in order to avoid damaging the optical components due to the small mode-field area (MFA) of the waveguides. The fibers connecting the lasers to the array faces have a MFA of about 80 $\mu m^2$ yielding a fluence of about 2 $J/cm^2$. The array itself is a polymeric Electro-Optic (EO) material, with the input power divided equally among the plurality of the waveguides. Furthermore, the cascading splitter network that divides power is also polymeric. Coupling directly into a single polymer waveguide on each surface would result in a fluence of about 40 $J/cm^2$, far in excess of the polymer's approximate 1-$J/cm^2$ damage threshold. To compensate for this issue, the optical layer is composed of multiple materials, with silica waveguides used for the first two stages of the cascading (Multi-Mode Interference) MMI splitter network (to go from 1 to 100 waveguides per side of the array) and polymer used for the last stage of the cascade (to go from 100 to 1000 waveguides) and the array itself.

The patterned silica waveguides are coupled directly to the polymer waveguides via lithography. Waveguides are fabricated of the same substrate material.

The communication mode for the system requires much less power than the lidar modes, therefore the lidar nodes dominate the power requirements for the system. Whether a solar array/battery configuration as described with reference to FIG. 2 or a system supplied by grid electrical power depends upon the efficiency of the lidar transmitters selected.

Each array face has its own lider transmitter and receiver, totaling four per node, so for lidar nodes each array operates in parallel and independently. Furthermore, a 250 mW fiber communications transmitter/receiver may be switched into the arrays, one at a time, according to the time window reserved for FSO communications.

Since lidar and communications are at 1550-nm wavelength, ranges may be affected by significant dust and fog. For example, at a fog visibility of 100-m visibility, the preceding node range would be reduced from nearly 400 m to 56 m at 1550-nm wavelength. In weather-based impairment is perceived by system, system may power down optical system and switch to operation using alternative methods.

Arrays are connected to independent laser sources and receivers and the four arrays may transmit and receive information in parallel. System seeks to search the volume and update tracking information every second.

For each array that scans 90° in azimuth and from −0.1° to +0.4° in elevation per second, 450,000 contiguous beams are transmitted. With 100 microseconds per beam dwell, it takes 45 seconds per volume scan for the various beam positions. In contrast, 10,000 dwells are achieved per second at 100 microseconds dwell intervals. To accomplish the volume update with few beams (10,000 versus 450,000), it is recognized that the cross-beam coverage at 500-m range is 8.7 cm. Therefore, for detection of objects of interest that are, for example, 0.5 m wide and 2 m tall, the system may be configured to transmit every fifth contiguous beam position in azimuth and every tenth beam position in elevation. In this manner, every transmitted azimuth beam position center is separated by approximately 44 cm, and each transmitted elevation beam position is separated by approximately 87 cm. Thus, a human, larger animal, or vehicle is covered by one of the distributed lidar beams. In order to further hedge against a potential intruder slipping through the volume of lidar beams, the system changes pulses every second, so that the plurality of beam position shave been covered in 45 seconds with 10,000 available beams. By using 2% of the 450,000 beam positions, 9000 per second are needed per array to adequately search the volume per second, with the plurality of the beam positions covered every 50 seconds.

For detection, a three-dimensional clutter map, storing information associated with a received echo or not received echo at each pulse resolution cell for each of the 450,000 beam positions (only partly updated per second, but fully updated every 50 seconds). A clutter map is used as opposed to Doppler detection in order to enable use of off-the-shelf, low-cost lidar systems. Even for expected detections of 400 m, detections may occur and for higher reflectivity objects out to 1 kilometer. Furthermore, 1500 range resolution cells result per beam position and 450,000 beam positions per array and with four arrays results in a clutter volume of 2.7 gigabytes. The memory of 2% of the memory cells is updated every second, with cells updated each 50 seconds. The detection algorithm determines physical motion by detecting changes in a number of contiguous cells over time. Once it is determined a grouping of cells of comparable range and angle have change, the node is directed to scan a 20×20 beam pattern for every other beam position over a 40×40 beam position area at that location as a priority interrupt from the search pattern. This would cover a 3.5×3.5-m cross-range at 500 m. If a significant portion of beam positions in this pattern receives echoes at about the same ranges, a detection is declared. During each successive second, a track-update beam is scheduled at the center of the detected beam pattern. Updates are entered into a track filter for each track. If a track update return is not received over several seconds, another 20×20 beam acquisition is attempted. Therefore, of the 9000 array dwells identified for each second, a multiple of 400 beams are interrupted for each transition to track.

When a detection has been determined and tracking initiate, the node transmits the track state data as well as the estimated cross-sectional area of the intruder to the nearby nodes and to the control system. At the control system, the cross-sectional area is an indication of intruder size and the tracking velocity indicates whether the intruder is potentially a vehicle traveling faster than a human. The information communicated by a node is used by other nodes to cue an acquisition of the intruding object. This further verifies the detection and maintains tracking by other nodes in case the intruder passes out-of-sight or behind obstacles with respect to the initial detection node. Due to Global Positioning System (GPS) uncertainty larger than the lidar beam and range accuracy, a receiving node may provide special monitoring of a beam patter covering the indicated location out to 5 to 10 meters on each side in azimuth depending upon ambiguity calculations for the target and lidar geometry. In this special region, the clutter map detector is set to high detection and corresponding false alarm probabilities in that area based on the acquisition message of a neighboring node. If the cued node makes a detection and transitions to a tracking process, it sends a message to neighboring nodes indicating a detection associated with the tracking state received by the cueing node that transmitted the tracking state. In this way, a basic swarming behavior is performed.

Since 10,000 dwells are available and 9,000 are used for detection, acquisition and tracking, 1000 dwells or 0.1 second per second is available for each array in order to communicate tracking and identification data via the FSO channel. Whereas four lidar sources and receivers, one for each array, one communication source for receipt is shared among the four arrays, with an array transmitting data in the direction of other nodes. At 100 Mbps, a total of 10 Mb may be transmitted and/or received at a time. Using a simple error detection and correction code of 12 bits per information bit, 0.8 Mb of data may be communicated per second per node. Using 32 bits per word, then 26,000 words per second may be sent or received from each node in the allocated 0.1-second window each second.

The system does not require mechanical gimbals since the optical phased arrays provide electronic beam pointing. At 1 kilometer of communication range between the neighboring nodes, it is sufficient that the transmitter aperture gain be used but significant receive aperture gain is not needed. Due to the short communication distances and low data rages, atmospheric turbulence compensation and advanced automatic gain control features are not needed.

A variety of network operational schemes may be devised for directive transmission and reception using combinations of time-division multiplexing (TDM) and wavelength-division multiplexing (WDM). As an example, for network initiation, each node is initially set for omni-directional reception in which the arrays are set to an approximate 0-dB gain (+/−3 dB). The control station transmits interrogation beams at low data rates, with an indication of GPS time, location and a node responsive time window. The control station beam sweeps in a 360° azimuth "interrogation" pattern. As individual nodes receive the interrogation, typically at different time frames, the nodes respond with high gain transmit beams pointing toward the control station within the indicated time window, during which time the monitor arrays are set to omni-directional gain. A number of potential interrogation response WDM channels are available from which each node is randomly assigned for transmission of a response. The control station can receive multiple responses at different WDM channels simultaneously for channel decoding during the response time windows. Alternatively, the nodes could use the same wavelength and, using GPS time synchronization, a TDM structure may be implemented in which each node takes turns communicating with the control station. FSO communications includes appropriate FSO error detection and correction coding and commercially available data encryption. The control station transmits interrogation beams followed by a listening time window for several cycles to ensure nodes have responded. The control station then communicates to each node a table of locations for the reporting nodes associated with the network. Following this, communications between nodes and control system are directional.

During each second using GPS time synchronization and position alignment, nodes perform surveillance, tracking, cued acquisition and intruder classification functions for the first 0.9 of a second and provide the remaining 0.1 second for transmission and reception of neighboring node acquisition cue tracking updates. During the 0.1-second window, nodes configure their arrays to receive from their nearest neighbors in anticipation of a potential acquisition cue message. Furthermore, nodes with tracking cue data transmit the associated information to their neighbors via their directive apertures. Furthermore, detections, tracking updates and identification images may be communicated to the control station during the 0.1-second window. The control station may also transmit commands to nodes during the 0.1-second window.

System may be applied to vehicle collision avoidance and control, short-range inter-vehicle communication and surveillance and communication inside of buildings.

In an example embodiment, successive sweeps of transmitted and reflected beams are used for determining the presence of a moving object. This will be further described with reference to FIG. 7.

Figure 7:
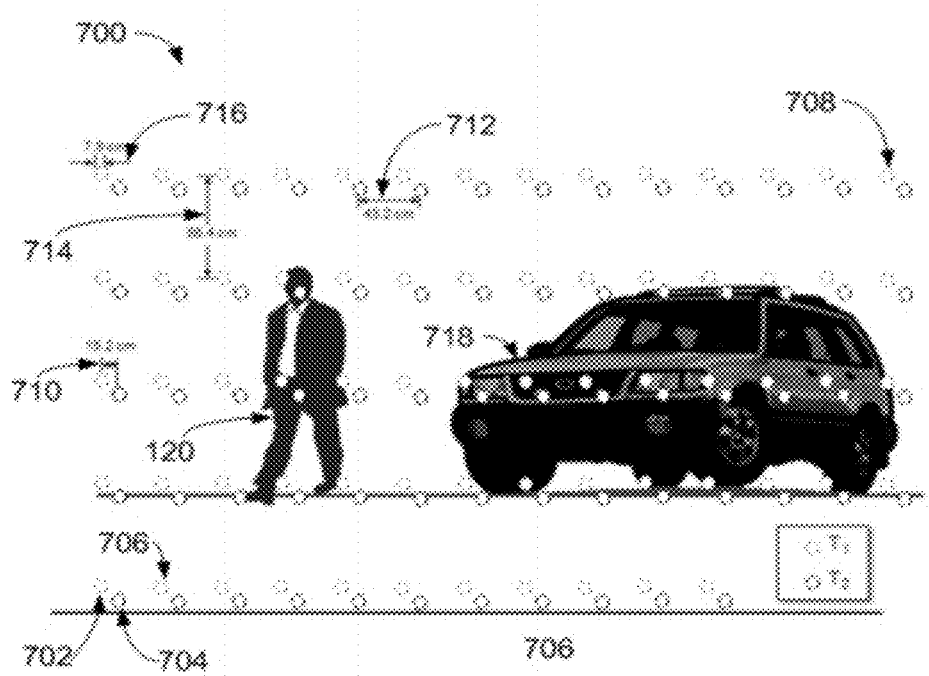
FIG. 7 is an example illustration for a beam transmission chart for the system as described with reference to FIG. 1, in accordance with an aspect of the present invention.

FIG. 7 is an example illustration for a beam transmission chart 700 for the system as described with reference to FIG. 1, in accordance with an aspect of the present invention.

Beam transmission chart 700 includes a plurality of dotted first lidar beams with a sampling noted as a dotted first lidar beam 702 and a plurality of dashed second lidar beams with a sampling noted as a dashed second lidar beam 704.

Dotted first lidar beam 702 indicates the transmission of a lidar beam and the reception of an associated echo if an echo occurs. The plurality of dotted first lidar beams represents a pattern of lidar beams transmitted in on second. The plurality of dashed second lidar beams represents a pattern of lidar beams transmitted in the second following the transmission of the dotted first lidar beams. For example, a dotted first lidar beam 706 follows the transmission of dotted first lidar beam 702. Furthermore, a dotted first lidar beam 708 represents the last beam of the plurality of dotted first lidar beams transmitted. Furthermore, dashed second lidar beam 704 follows transmission of dotted first lidar beam 708.

The distance between the dotted first lidar beams and the associated dashed second lidar beams is noted as a distance 710. As a non-limiting example distance 710 may be configured for 15.2 cm. The distance between successive dotted first lidar beams is noted as a distance 712. As a non-limiting example, distance 712 may be configured as 43.2 cm. The distance in height between one row of dotted first lidar beams and a following row of dotted first lidar beams is noted as a distance 714. As a non-limiting example, distance 714 may be configured as 86.4 cm. The diameter of a dotted first lidar beam is noted as a diameter 716. As a non-limiting example, diameter 716 may be configured as 7.9 cm.

The transmitted and reflected beams are used for detecting moving objects as noted by intruder 120 and a vehicle 718. Comparisons between the sweeps of transmitted and reflected beams are performed for determining the movement of an object. For example, a plurality of beams reflected in one sweep of beams and a similar shaped reflection in a succession of following sweeps but in a different location may indicated the presence and movement of an object.

In an example embodiment a system in accordance with the present invention detects an intruder due to movement and change in distance between the intruder and node between sweeps of transmitted lidar beams. This will be further described with reference to FIG. 8.

Figure 8:
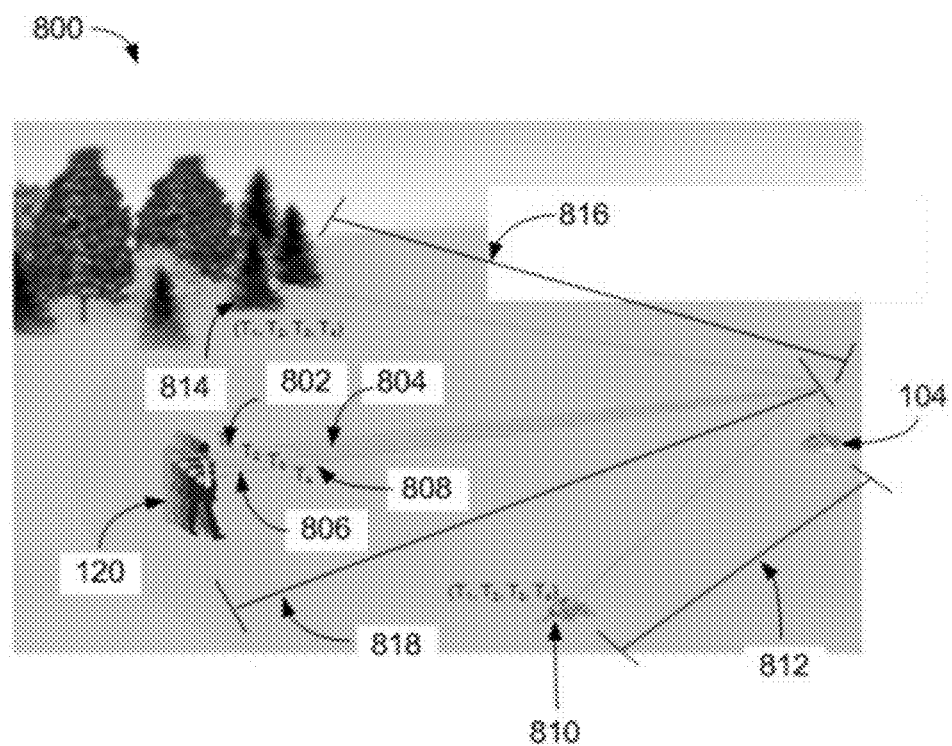
FIG. 8 illustrates intruder detection for the example system as described with reference to FIG. 1, in accordance with an aspect of the present invention.

FIG. 8 illustrates intruder detection for the example system as described with reference to FIG. 1, in accordance with an aspect of the present invention.

Four sweeps of lidar beam transmissions are presented with a first sweep of beam transmissions noted as a beam transmissions portion 802, a second sweep of beam transmissions noted as a beam transmissions portion 804, a third sweep of beam transmissions noted as a beam transmissions portion 806 and a beam transmissions noted as a beam transmission portion 808.

Beam transmissions portion 802 is transmitted first, followed by beam transmissions portion 804, followed by beam transmissions portion 806 and beam transmission portion 808.

The distance between a rock 810 and node 104 is noted as a distance 812. The location of rock 810 as observed by node 104 and the distance observed between rock 812 and node 104 does not change between sweeps of transmitted lidar beams. Therefore, node 104 does not detect rock 810 as an intruder.

The distance between a tree 814 and node 104 is noted as a distance 816. The location of tree 814 may change between sweeps of transmitted lidar beams due to wind; however, the distance does not change between sweeps of transmitted lidar beams. Therefore, node 104 does not detect tree 814 as an intruder.

The location of intruder 120 is observed as changed by node 104 between sweeps of transmitted lidar beams. Furthermore, the distance between intruder 120 and node 104 as noted by a distance 818 is observed as different between the sweeps of transmitted lidar beams. For example, the location of intruder 120 as observed by beam transmissions portion 802 is observed as different from the location of intruder as observed by beam transmissions portion 804. Furthermore, the distance between intruder 120 and node 104 is observed as being different between beam transmissions portion 802 and beam transmissions portion 804. As a result of detecting a different location and movement in the direction of node 104, intruder 120 is noted as an intruder.

Following detection as an intruder, node 104 performs classification and tracking for intruder 120. Furthermore, node 104 communicates information associated with intruder 120 to other nodes and the control station. Furthermore, other nodes and control station may perform detection, classification, tracking and communication for intruder 120.

In an example embodiment, a system in accordance with aspects of the present invention transmits lidar beams, lidar beams are reflected from external entities, reflected beams are detected and received to perform intruder detection, classification and tracking. Information associated with intruder detection, classification and tracking may be presented for viewing and communicated externally to other nodes and the control system. This will be further described with reference to FIG. 9.

Figure 9:
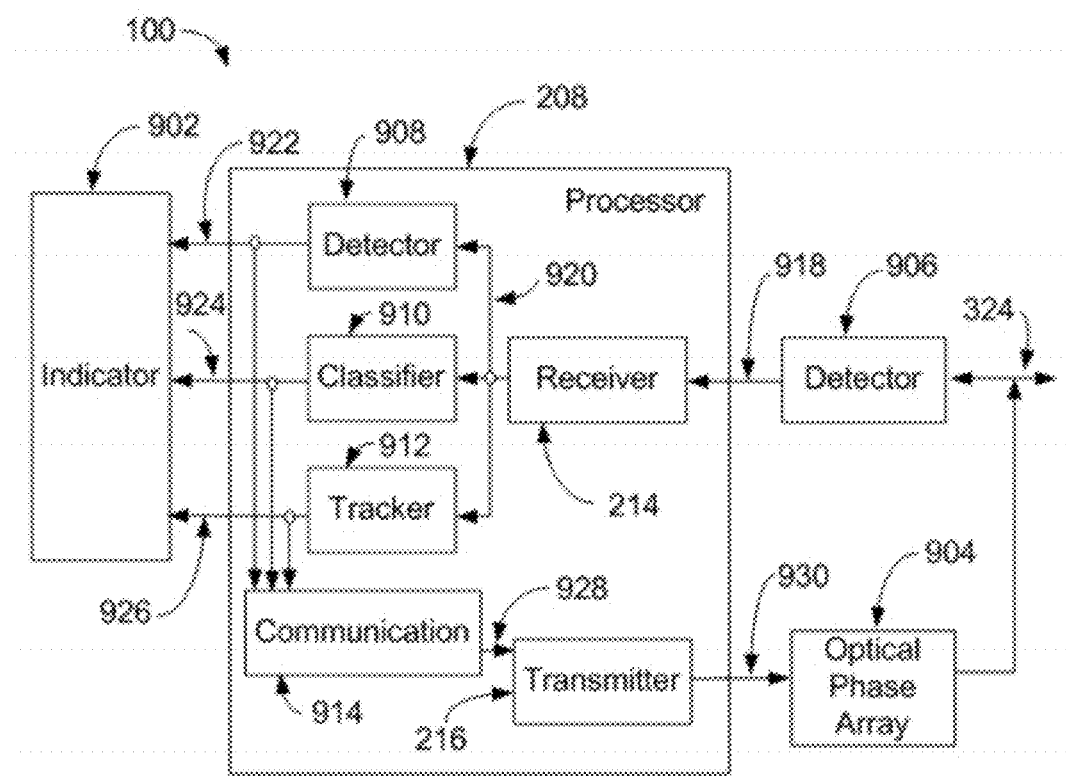
FIG. 9 illustrates an example system as described with reference to FIG. 1, in accordance with an aspect of the present invention.

FIG. 9 illustrates an example system as described with reference to FIG. 1, in accordance with an aspect of the present invention.

Intruder network system 100 includes processor portion 208, an indicator portion 902, an optical phased array portion 904 and a detector portion 906. In this example, processor portion 208, indicator portion 902, optical phased array portion 904 and detector portion 906 are distinct elements. In some embodiments, at least two of processor portion 208, indicator portion 902, optical phased array portion 904 and detector portion 906 may be combined as a unitary device.

Further, in some embodiments at least one of processor portion 208, indicator portion 902, optical phased array portion 904 and detector portion 906 may be implemented as a computer having stored therein tangible computer-readable media for carrying or having computer-executable instructions or data structures stored thereon.

Indicator portion 902 presents information associated with intruders. For example, indicator portion 902 may present location, size, movement and classification for an intruder. Optical phased array portion 904 performs beam shaping for a lidar beam. Detector portion 906 receives optical information transmitted by optical phased array portion 904 and reflected by external entities and receives optical information communicated from other nodes and the control station. Detector portion 906 converts optical communicated information to electrical communicated information.

Processor portion 208 includes receiver portion 214, transmitter portion 216, a detector portion 908, a classifier portion 910, a tracker portion 912 and a communication portion 914.

Detector portion 908 performs detection of intruders. For example, detector portion 908 may detect the presence of an animal, human or a vehicle. Classifier portion 910 performs classification of intruders. For example, an intruder may be classified by classifier portion 910 as animal, human or vehicle. Tracker portion 912 tracks the location and movement of an intruder. For example, tracking portion may track that an intruder is 100 meters from a node and is traveling toward the node at 20 kilometers per hour. Communication portion 914 communicates information associated with detector portion 908, classifier portion 910 and tracker portion 912 to external entities.

Detector portion 906 receives optical information via optical communication channel 324. Receiver portion 214 receives information from detector portion 906 via a communication channel 918. Detector portion 908 receives information from receiver portion 214 via a communication channel 920. Classifier portion 910 receives information from receiver portion 214 via communication channel 920. Tracker portion 912 receives information from receiver portion 214 via communication channel 920. Indicator portion 902 receives information from detector portion 908 via a communication channel 922. Indicator portion 902 receives information from classifier portion 910 via a communication channel 924.

Indicator portion 902 receives information from tracker portion 912 via a communication channel 926. Communication portion 914 receives information from detector portion 908 via communication channel 922. Communication portion 914 receives information from classifier portion 910 via communication channel 924. Communication portion 914 receives information from tracker portion 912 via communication channel 926. Transmitter portion 216 receives information from communication portion 914 via a communication channel 928. Optical phased array portion 904 receives information from transmitter portion 216 via a communication channel 930. Optical phased array portion 904 transmits information via optical communication channel 324.

In operation, processor portion 208 via way of transmitter portion 216 and optical phased array portion 904 transmit lidar beams via optical communication channel 324. Transmitted beams are received by external entities and reflected back to detector portion 906 via optical communication channel 324. Detector portion 906 converts received lidar beams to electrical information and communicates information to receiver portion 214.

Receiver portion 214 provides received information to detector portion 908, classifier portion 910 and tracker portion 912. Detector portion 908 receives information from receiver portion 214 and performs detection of intruder or intruders. Classifier portion 910 receives information from receiver portion 214 and performs classification of an intruder or intruders. Tracker portion 912 receives information from receiver portion 214 and performs tracking of intruder or intruders.

Indicator portion 902 receives information from detector portion 908, classifier portion 910 and tracker portion 912 and presents information based upon the results received from detector portion 908, classifier portion 910 and tracker portion 912. For example, if detector portion 908 indicates detection of an intruder, indicator portion 902 may indicated the presence of an intruder and if classifier portion 910 determines an intruder is a vehicle, then indicator portion 902 indicates the respective intruder as a vehicle, and if tracker portion 912 determines velocity of the intruder is 20 kilometers per hour, then indicator portion 902 indicates the velocity of the intruder is 20 kilometers per hour.

Communication portion 914 receives information from detector portion 908, classifier portion 910 and tracker portion 912 and communicates information based upon the results received from detector portion 908, classifier portion 910 and tracker portion 912. Furthermore, communication portion 914 communicates information to external entities via transmitter portion 216, optical phased array portion 904 and optical communication channel 324. For example, if detector portion 908 indicates detection of an intruder, communication portion 914 may communicate the presence of an intruder and if classifier portion 910 determines an intruder is a vehicle, then communication portion 914 communicates the respective intruder as a vehicle, and if tracker portion 912 determines velocity of the intruder is 20 kilometers per hour, then communication portion 914 communicates the velocity of the intruder is 20 kilometers per hour.

FIG. 10 illustrates an example method 1000 for detecting, classifying, tracking and communicating information associated with an intruder, in accordance with an aspect of the present invention.

Method 1000 starts (S1002) with a node (e.g. node 102) detecting geographic location via GPS (S1004). For example, as described with reference to FIG. 3, processor portion 208 receives location information via communication channel 314, GPS antenna 222 and GPS receiver 212. As a non-limiting example, a node determines the time of day is 8:30 A.M Eastern Standard Time (EST).

Returning to FIG. 10, the node then transmits lidar beams (S1006). For example, as described with reference to FIG. 3 and FIG. 7, processor portion 208 transmits sweeps of beams via transmitter portion 216, optical layer portion 228 and optical communication channel 324. As a non-limiting example, a node transmits a plurality of sweeps of lidar beams in 360° about the location of the node.

Returning to FIG. 10, the node then receives reflected lidar beams (S1008). For example, as described with reference to FIG. 5, a reflected version of lidar beam 513 is reflected as reflected lidar beam 518. As a non-limiting example, lidar beams are transmitted and reflected by an intruder moving towards the node.

Returning to FIG. 10, the node then processes reflected lidar beams (S1010). For example, as described with reference to FIG. 6, the node creates and processes information associated with a three-dimensional clutter map. As a non-limiting example, a node transmits a first sweep of lidar beams, stores the reflected lidar beam information in first three-dimensional clutter map, transmits a second sweep of lidar beams, stores the reflected beam information in a second three-dimensional clutter map, then compares the two clutter maps to determine if an intruder has been detected.

Returning to FIG. 10, the node then detects intruder (S1012). For example, after comparing the three-dimensional clutter maps, the node determines it has detected an intruder. As a non-limiting example, the reflected and processed lidar beams indicated an intruder has been detected.

Then the node classifies the detected intruder (S1014). For example, the node compares signature information received for intruder and compares signature to know signatures for determining the class associated with the intruder. For example, the node may classify the intruder as an animal, human or vehicle.

Then the node tracks the intruder (S1016). For example, the node processes received information for intruder to determine information associated with intruder. Non-limiting examples of information determined include velocity, location and size. As a non-limiting example, node determines intruder is a vehicle traveling at 20 kilometers per hours in the direction of the node.

Then the node communicates information associated with the intruder to other nodes and the control system (S1018). For example, as described with reference to FIG. 5, the node initially detecting intruder communicates information associated with intruder to other nodes and to the control system. As a non-limiting example, node communicates the location of the intruder to the other nodes and the control system and communicates the intruder is a vehicle traveling toward the node at 20 kilometers per hour.

Returning to FIG. 10, then the other nodes and the control system detect, classify, track and communication information associated with intruder (S1020). For example, as described with reference to FIG. 5, the other nodes and the control system perform processing associated with the intruder. As a non-limiting example, the control system detects, classifies and tracks intruder and communicates information associated with intruder to other nodes.

Returning to FIG. 10, execution of method 1000 terminates (S1022).

An intruder network system has been presented for detecting, classifying and tracking an intruder via lidar. System includes a plurality of nodes transmitting lidar, receiving reflected lidar and processing reflected lidar. Furthermore, a node may communicate information associated with a potential intruder to other nodes via lidar. During the detection portion, lidar beams are transmitted in a sparse pattern enabling searching for an intruder over a particular volume of interest. During classifying and tracking portions, lidar beams are transmitted in a tight pattern over a small volume of interest where detection for an intruder was recognized. A node may communication information to other nodes via lidar by focusing and transmitting beams in the direction of other neighboring nodes.

The foregoing description of various exemplary embodiments of the invention have been presented for purposes of illustration and description. It is not intended to be exhaustive or to limit the invention to the precise forms disclosed, and many modifications and variations are possible in light of the above. The example embodiments, as described above, were chosen and described in order to best explain the principles of the invention and its practical application to thereby enable others of ordinary skill in the art to practice the invention in various embodiments and with various modifications as are suited to the particular use contemplated. The scope of the invention is defined by the following claims.

What is claimed is:

1. A device for detecting a presence of an object, said device comprising:
    an optical phased array operable to transmit a first optical beam to a first location at a first time and to transmit a second optical beam to a second location at a second time;
    a detector operable to detect a first reflected beam based on the first optical beam and to detect a second reflected beam based on the second optical beam;
    a processing portion operable to determine the presence of the object based on the first reflected beam and the second reflected beam; and
    an indicator operable to generate an indicator signal based on the presence of the object,
    wherein said optical phased array is further operable to transmit an information optical beam to a third location at a third time, and wherein the information optical beam includes information based on the indicator signal.

2. The device of claim 1, wherein said optical phased array is further operable to transmit a fourth optical beam to a fourth location at a fourth time, and wherein the first location, the second location and the fourth location are disposed in a line.

3. The device of claim 2, wherein said optical phased array is further operable to transmit a fifth optical beam to a fifth location at a fifth time, a sixth optical beam to a sixth location at a sixth time, and a second optical beam to a seventh location at a seventh time, and wherein the fifth location, the sixth location and the seventh location are disposed in a second line.

4. A device for detecting a presence of an object, said device comprising:
    an optical phased array operable to scan a first plurality of points at a first time and to scan along a second plurality of points at a second time;
    a detector operable to detect a first set of reflected beams based on the first plurality of points and to detect a second set of reflected beams based on the second plurality of points; and
    a processing portion operable to determine the presence of the object at the second time based on the first reflected beams and the second reflected beams,
    wherein, when said processing portion determines the presence of the object at the second time, said processing portion is further operable to instruct said optical phased array to scan along a third plurality of points at a third time, and wherein the third plurality of points is greater in number than the first plurality of points,
    wherein said optical phased array is further operable to transmit an information optical beam to a fourth location at another time, and wherein the information optical beam includes information based on an indicator signal generated based on the presence of the object.

5. The device of claim 4, wherein said processing portion is further operable to instruct said optical phased array to scan along the third plurality of points such that the third plurality of points cover a smaller area than the first plurality of points.

6. The device of claim 5, wherein said optical phased array is further operable to scan along a fourth plurality of points at a fourth time, wherein said detector is further operable to detect a third set of reflected beams based on the third plurality of points and to detect a fourth set of reflected beams based on the fourth plurality of points, wherein said processing portion is further operable to track a vector of the object at the fourth time based on the third reflected beams and the second reflected beams.

* * * * *